United States Patent

[11] 3,572,029

[72] Inventor Arthur P. Swift, Jr.
Woodland Hills, Calif.
[21] Appl. No. 855,232
[22] Filed Sept. 4, 1969
[45] Patented Mar. 23, 1971
[73] Assignee The United States of America, as represented by the Secretary of the Air Force

[54] ROCKET ENGINE THRUST CHAMBER ATTACHMENT MEANS
4 Claims, 1 Drawing Fig.
[52] U.S. Cl................................................. 60/39.32, 60/232, 239/265.35
[51] Int. Cl............................................. F02c 7/20
[50] Field of Search........................................ 60/228, 229, 230, 232, 39.32; 239/265.35, (Inquired)

[56] References Cited
UNITED STATES PATENTS
| 3,182,452 | 5/1965 | Eldred | 60/232 |
| 3,230,708 | 1/1966 | Huang | 60/232 |
| 3,401,887 | 9/1968 | Sheppard | 239/265.35 |
| 3,451,625 | 6/1969 | Fruktaw | 239/265.35 |

Primary Examiner—Clarence R. Gordon
Attorneys—Harry A. Herbert, Jr. and Arsen Tashjian ABSTRACT: A yieldable mounting ring of teardrop cross section is mounted between a solid wall rocket engine thrust chamber wall and a sleeve holding the gimbal assembly which provides for the thrust direction control capability of the engine. The ring is segmented to expand and contract and allow unrestricted dimensional changes in the thrust chamber while maintaining the chamber in alignment with any attached structural elements.

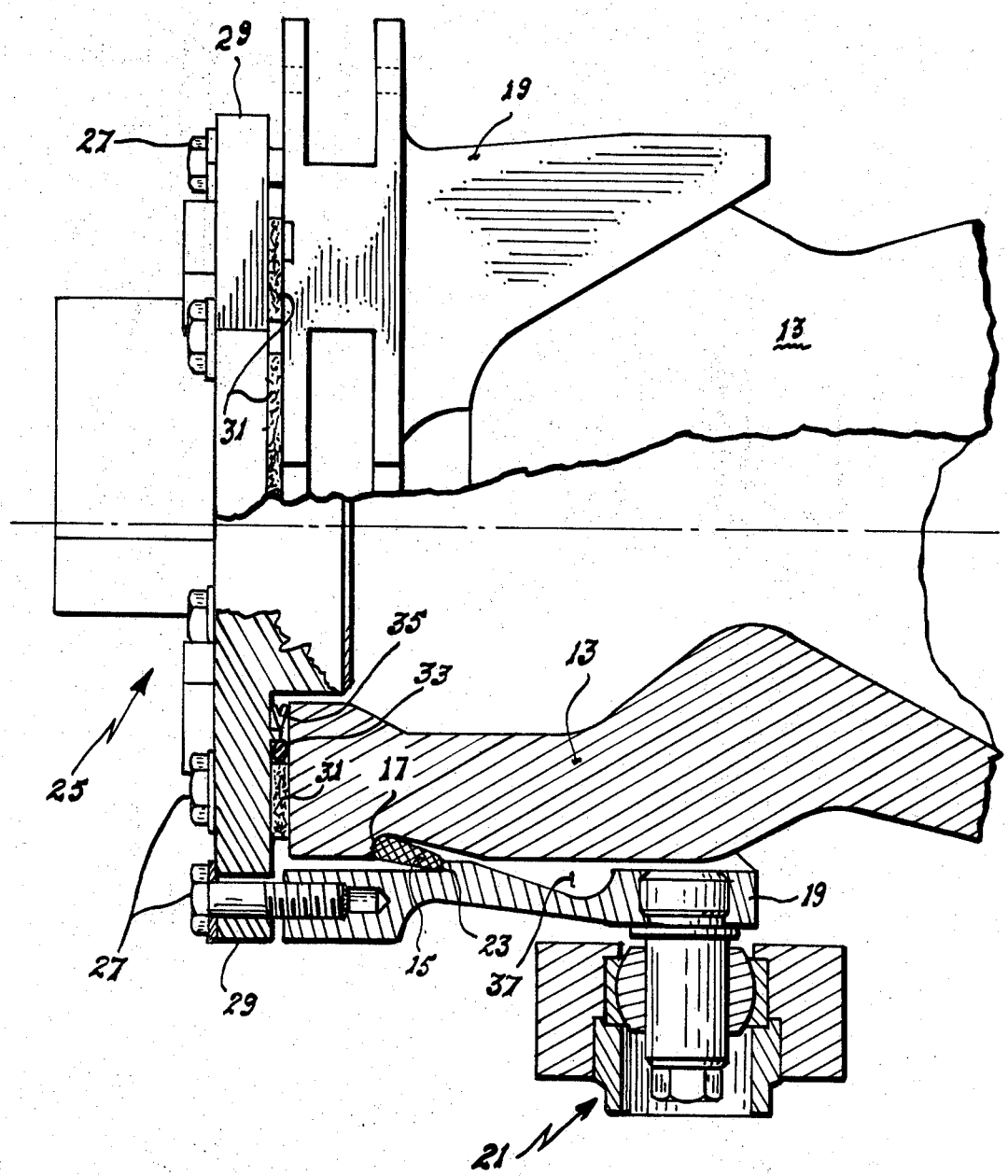

ROCKET ENGINE THRUST CHAMBER ATTACHMENT MEANS

BACKGROUND OF THE INVENTION

This invention relates to a means for attaching various structural and functional elements to a rocket engine and, more particularly, the invention is concerned with providing a yieldable ring to be interposed between a rocket engine thrust chamber and the gimbal assembly which maintains the engine in proper alignment. The ring arrangement is capable of compensating for thermal growth of the rocket chamber.

Heretofore, it has been normal practice to attach various necessary components to a rocket engine thrust chamber by means of drilled and/or tapped holes. These components may include such items as the injector, gimbal actuator brackets and gimbal bearings. The presence of drilled or tapped holes can cause longitudinal and transverse cracks to originate in the chamber walls because of the rather brittle and notch sensitive nature of the material from which most chambers are fabricated. This situation is particularly serious where material such as beryllium is used for the rocket engine thrust chamber. The cracks in the chamber wall propagate themselves from the sharp edges of the tapped holes and other discontinuities resulting from the machining necessary to make the various attachments.

Because of the large heat gradient and differential expansion between the chamber and gimbal mount during the firing phase, a rigid, circular clamping device would not be acceptable. This is so on the basis of the destructive restraint which would be put on the thrust chamber. Therefore, it becomes evident that some form of spring relief is necessary.

One method of solving the problem related to a solid wall thrust chamber fabricated from a brittle material such as pure beryllium or the like, would be to provide a spring relief device that is rigid enough to maintain proper alignment of the injector and gimbal structure while still being capable of absorbing the thermal growth of the chamber during the firing phase. It is necessary that the various attachments be made to the thrust chamber without imposing tensile loads or stress raisers in the chamber walls. A smooth symmetrical chamber shape without bosses or other discontinuities is the ideal configuration in order to minimize thermal distortion.

SUMMARY OF THE INVENTION

The present invention provides an attachment means for assembling a rocket engine thrust chamber wherein all drilled and tapped holes in the chamber wall are eliminated. This is accomplished while at the same time permitting thermal growth of the thrust chamber during the firing phase and maintaining alignment of the gimbal and injector structure.

A split or segmented metal ring made of titanium or the like is interposed between the rocket chamber wall and the gimbal assembly. The ring expands by movement of the segments in response to the thermal growth of the chamber wall during the firing phase of the rocket engine. The use of the herein described invention permits the attachment of the various accessories without the presence of drilled holes and discontinuities in the thrust chamber wall thereby eliminating the problem of stress raisers and crack propagation which normally would originate in these areas.

Accordingly, it is an object of the present invention to provide a means for attaching a rocket engine thrust chamber to a gimbal mount without using drilled or tapped holes in the chamber walls.

Another object of the invention is to provide a thrust chamber attachment means including a bolting flange for fastening the injector assembly to the upstream end of the rocket engine.

Still another object of the invention is to provide a rocket engine thrust chamber attaching arrangement whereby the injector element is isolated from the chamber heat.

A further object of the invention is to provide a gimballed rocket engine thrust chamber attaching means wherein the gimbal mounting bracket is completely isolated from the chamber heat.

Another further object of the invention is to provide an attachment means for a rocket engine thrust chamber which permits substantially unrestricted thermal growth of the thrust chamber during the firing phase.

Another still further object of the invention is to provide a means for attaching a rocket engine gimbal assembly wherein various structures including the gimbal and injector assemblies are maintained in alignment thereby.

Still another object of the invention is to provide a rocket engine thrust chamber attachment means which does not interfere with the self-regenerative cooling mechanics required for efficient operation of a solid wall beryllium chamber or the like.

These and other objects, features and advantages will become more apparent after considering the following description taken in conjunction with the attached drawing wherein like members are used to refer to like elements.

DESCRIPTION OF THE DRAWINGS

The FIG. is a side view illustrating a rocket engine thrust chamber attachment means according to the invention partially in section to show details of the various associated components.

DESCRIPTION OF A PREFERRED EMBODIMENT

Referring now to the drawing, there is shown a rocket engine including a thrust chamber 13 preferably fabricated of a rather brittle material such as pure beryllium. By nature, this material is notch sensitive, that is, holes and other similar discontinuities will produce localized stress concentration areas which can lead to failure of the part. This is a serious design consideration, and ideally, it would be most desirable to eliminate these stress concentration factors entirely by providing some other means for attaching various structural and functional elements to the thrust chamber 13.

The present invention accomplishes this by providing a ring 15 of teardrop cross section positioned in a smooth shallow groove 17 on the wall of the thrust chamber 13. The ring 15 is preferably of metal such as titanium or the like and is segmented or split so that it can expand and contract with the changes in dimensions of the thrust chamber 13 caused by corresponding temperature changes. A circular sleeve 19 surrounds the upstream end of the rocket engine thrust chamber 13 and is spaced therefrom. The sleeve 19 is also preferably fabricated of titanium and serves as gimbal mount with the gimbal assembly 21. The teardrop ring 15 is retained in position between the chamber 13 and the sleeve 19 by engaging a shoulder 23 on the inner surface of the sleeve 19. In a typical embodiment, the groove 17 engages the larger diameter portion of the teardrop ring 15 while the shoulder 23 engages the smaller diameter portion.

The injector 25 is bolted to the sleeve 19 by means of the bolts 27 which pass through the injector flange 29. The bolting of the flange 29 to the sleeve 19 provides the necessary loading of the teardrop ring 15 in the groove 17 of the thrust chamber 13. Sealing means including the gasket 31, O-ring 33 and V-ring 35 are positioned between the downstream end surface of thrust chamber 13 and the inner surface of the injector flange 29. These sealing means are designed to allow for dimensional changes of the thrust chamber 13 during the firing phase while still maintaining a pressure tight seal.

It can be seen that, by proper design of the groove 17 and ring 15, the loads produced by the bolts 27 are transferred as a compression load to the rocket thrust chamber 13. As the chamber heats up during firing, thermal growth of the chamber 13 tends to rotate the circular segments of the ring 15 in the groove 17. A gap or insulation space 37 is provided between the gimbal support sleeve 19 and the outer wall of the thrust chamber 13. This space 37 serves to reduce heat transfer between the elements thus enhancing the self-regenerative cooling mechanism of the solid wall rocket engine thrust chamber 13.

Although the invention has been illustrated in the accompanying drawing and described in the foregoing specification in terms of a preferred embodiment thereof, the invention is not limited to this embodiment or to the particular configurations mentioned. It will be apparent to those skilled in the art that this invention can be used efficiently in other situations where it is desired to attach various components to an expanding and contracting body without drilling or tapping holes therein and without the uses of bosses or other discontinuities thereon. Also, it should be understood that various changes, alterations, modifications and substitutions, particularly with respect to the construction details, can be made in the arrangement of the several element without departing from the true spirit and scope of the appended claims.

I claim:

1. Means for attaching structural elements to a solid wall rocket engine thrust chamber, said attachment means comprising a yieldable ring partially disposed in a shallow groove machined in the surface of the outer wall of the thrust chamber, a gimbal mounting sleeve surrounding the outer wall of the thrust chamber and spaced therefrom, said ring being positioned between the chamber and said sleeve, said sleeve having a shoulder thereon for operative engagement with a part of said ring, an injector bolted against the upstream face of the thrust chamber, the bolts holding said injector threadably engaging said sleeve and serving to transfer the compression load thereby produced through said ring to the chamber, said attachment means allowing substantially unrestricted thermal growth of the chamber while maintaining the chamber in alignment with the attached structural elements.

2. The attachment means defined in claim 1 wherein said yieldable ring is segmented to allow movement thereof in the groove in the wall of the thrust chamber in response to dimensional changes thereof.

3. The attachment means defined in claim 2 wherein the cross-sectional shape of said yieldable, segmented ring is of teardrop configuration, the larger end of said ring being disposed in the shallow groove in the outer wall of the thrust chamber and the smaller end of said ring being positioned against the shoulder on said gimbal mounting sleeve.

4. The attachment means defined in claim 3 wherein said yieldable, segmented ring is fabricated of titanium.